Oct. 27, 1959   W. WILKENLOH ET AL   2,910,281
PROP AND CONVEYER ARRANGEMENT FOR MINES
Filed Oct. 17, 1957   2 Sheets-Sheet 1

INVENTORS
Wilhelm Wilkenloh,
Erich Jaeger and Friedhelm
BY  Kuehnapfel
Michael S. Striker
Attorney Oct. 27, 1959 W. WILKENLOH ET AL 2,910,281
PROP AND CONVEYER ARRANGEMENT FOR MINES
Filed Oct. 17, 1957 2 Sheets-Sheet 2
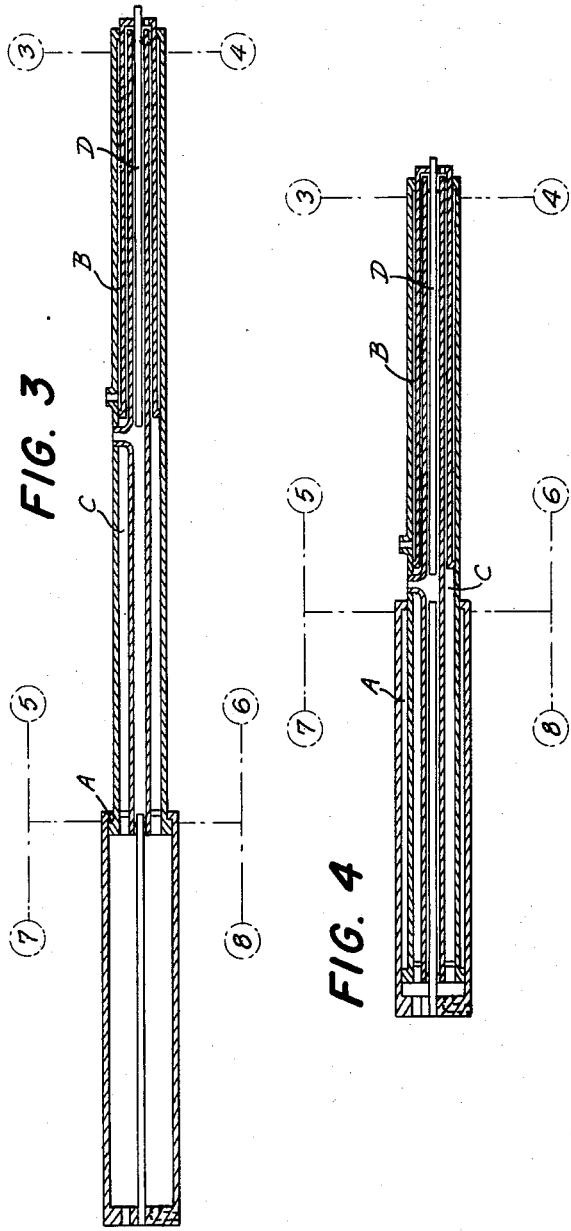
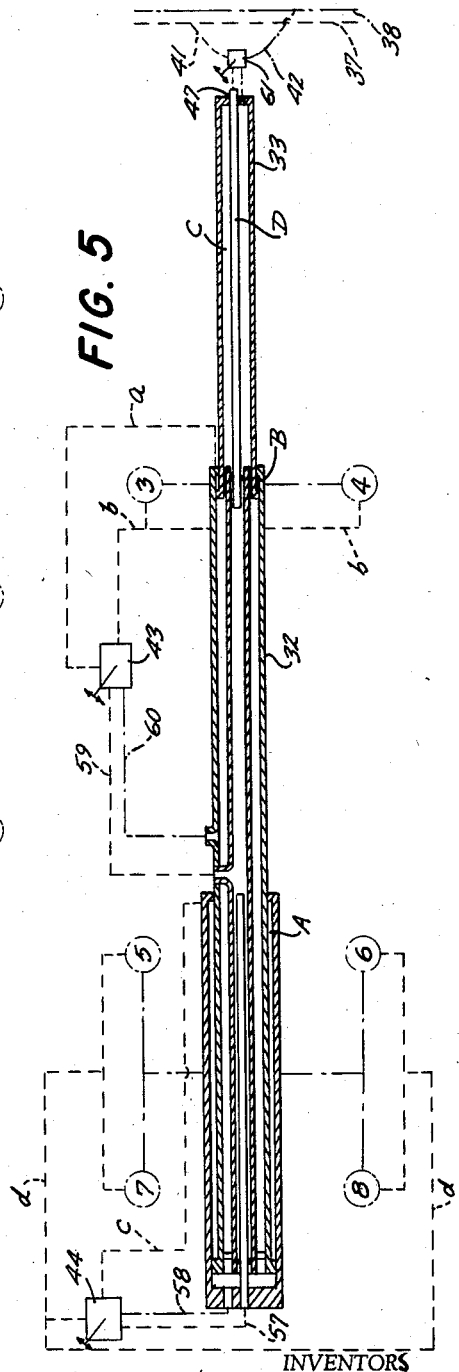
INVENTORS
Wilhelm Wilkenloh,
Erich Jaeger and Friedhelm
BY Kuehnapfel
Michael S. Striker
Attorney

2,910,281

PROP AND CONVEYER ARRANGEMENT FOR MINES

Wilhelm Wilkenloh and Erich Jäger, Duisburg-Wanheim, and Friedhelm Kühnapfel, Duisburg-Buchholz, Germany, assignors, by mesne assignments, to Rheinstahl Wanheim Gesellschaft mit beschränkter Haftung Application October 17, 1957, Serial No. 690,740

Claims priority, application Germany October 19, 1956

7 Claims. (Cl. 262—1)

The present invention relates to mining machinery.

More particularly, the present invention relates to a conveyer and prop arrangement for mines. With such arrangements it is conventional to have an elongated conveyer extend along a mine face with a row of prop groups extending along the conveyer. Each of the prop groups includes a front sub-group located adjacent the conveyer and a rear sub-group located on the side of the front sub-group opposite from the conveyer, and advancing means is provided for advancing the conveyer or either of the sub-groups so that in this way the arrangement is advanced as the mining proceeds. Usually, a separate advancing means is provided for the conveyer and a separate advancing means is provided for each group of props, and the hydraulic conduits required for the great number of hydraulic advancing means are exposed so that they are easily injured.

One of the objects of the present invention is to provide in a conveyer and prop arrangement of the above type a single advancing means common to the conveyer and the front and rear prop means.

Another object of the present invention is to provide in an arrangement of the above type a positioning of the hydraulic conduits which reduces the length of exposed hydraulic conduits to a minimum.

It is also an object of the present invention to provide an arrangement of the above type which may be operated in a number of different ways and which permits the conveyer to be advanced either by steps or continuously so that there is a great flexibility in the manner in which the structure of the invention may be operated.

An additional object of the present invention is to provide structure capable of accomplishing the above objects and at the same time composed of simple and ruggedly constructed elements which are very reliable in operation and which are capable of withstanding the rigors of mining for a long period of time.

With the above objects in view, the present invention includes in a prop and conveyer arrangement for mines a single hydraulic advancing means connected operatively with a conveyer as well as a front prop means adjacent the conveyer and a rear prop means on the side of the front prop means opposite from the conveyer for advancing the conveyer means, the front prop means, and the rear prop means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a schematic illustration of the structure of the invention in a second position of the parts thereof;

Fig. 4 is a schematic illustration of the structure of the invention in a third position of the parts thereof; and Fig. 5 is a schematic illustration of the hydraulic circuit in its entirety.

Figure 1:
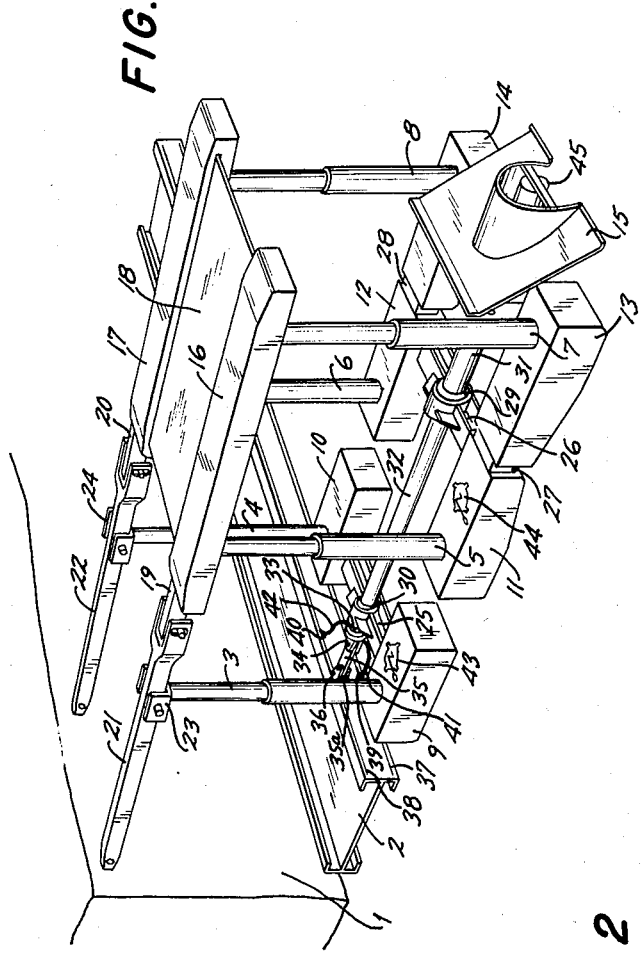
Fig. 1 is a perspective view of an apparatus according to the present invention.

Fig. 1 shows a mine face 1 along which an elongated conveyer means 2 extends, this conveyer means being in the form of an elongated chute, for example. During the mining of the coal face 1 the conveyer means is advanced forwardly toward the face 1. A front prop means is located just behind and adjacent to the conveyer means 2, and a rear prop means is located just behind the front prop means, so that the front prop means is located between the conveyer means and the rear prop means.

The front prop means includes a pair of hydraulic props 3 and 4, while the rear prop means includes the four hydraulic props 5, 6, 7 and 8. Thus, the props 3–8 form a group of props of which the props 3 and 4 form one sub-group and the props 5–8 form another sub-group, and a plurality of such groups of props are arranged in a row closely adjacent to each other along the conveyer means.

The several props 3–8 are respectively carried by base members 9–14 which engage the floor of the gallery, and these base members are large enough to provide a reliable, stable support for the props while they advance. The front and rear prop means may each be advanced separately.

The props 5 and 7 are connected to an elongated cap member 16 while the props 6 and 8 are connected to an elongated cap member 17 which is parallel to the cap member 16, and a sheet metal screen 18 extends between and is connected to the caps 16 and 17, the caps 16 and 17 pressing against the roof of the mine gallery when the props 5–8 are set.

A pair of elongated cap members 19 and 20 are carried in the interior of the cap members 16 and 17, respectively, for longitudinal sliding movement with respect to the latter cap members, and the cap members 16 and 17 may be tubular for this purpose, so that the cap members 19 and 20 cooperate telescopically with the cap members 16 and 17, respectively.

A pair of front blocking cap members 21 and 22 are pivotally connected at their rear ends to the cap members 19 and 20, respectively, Fig. 1 showing pin and slot connections for this purpose. The head members 23 and 24 of the props 3 and 4, respectively, are pivotally connected with the front blocking caps 21 and 22, respectively, as shown in Fig. 1.

The base members 9 and 10 are interconnected by a transverse beam 25, and the base members 11 and 12 are interconnected by a transverse beam 26. The base members 11 and 13 are interconnected by a rubber block 27, while the base members 12 and 14 are interconnected by a rubber block 28, so that the base members 11 and 13 are resiliently and yieldably interconnected for angular movement with respect to each other, while the base members 12 and 14 are also yieldably and resiliently connected for angular movement with respect to each other. The beams 25 and 26 respectively have metallic sleeves fixed thereto, as by welding or the like, at central portions thereof, and hollow rubber cylinders 30 and 29 are respectively located in these metallic sleeves. Thus, these metallic sleeves engage the outer surfaces of the hollow rubber cylinders, and a pair of tubes 31 and 32 of an advancing means respectively extend through and are in engagement with the cylinders 29 and 30. These cylinders 29 and 30 are made of a yieldable rubber so that the rubber cylinders provide a yieldable resilient transmission of movement between the advancing means and the prop means.

The coaxial tubes 31 and 32 are telescopically connected together, and a third tube 33 cooperates telescopically with the tube 32 and is connected at its front end to the conveyer means 2. The connection of the front end of the tube 33 with the conveyer means takes the form of a rigid link member 35 pivotally connected at its rear end to the front end of the tube 33, and the pivotal connection may take the form of a bifurcated element 34 fixed to the front end of the tube 33 and receiving the rear end of the link 35 with a suitable pivot pin passing through the elements 34 and 35. In the same way, a bifurcated element 36 which is fixed to the conveyer means 2, receives the front end of the link 35 and a suitable pivot pin passes through element 36 and the front end of element 35 so as to pivotally connect the link 35 to the conveyer means 2.

A header tube 37 for supplying hydraulic liquid under pressure to the several groups of props extends along and is fixed to the conveyer means 2, while a return flow header 38 also extends along and is fixed to the conveyer means 2. The headers 37 and 38 have T-connections or the like 39 and 40, respectively, for the flexible hose elements 41 and 42, respectively which provide communication between the headers and the front end of the tube 33, the hoses 41 and 42 communicating at their ends distant from the headers with the interior of the tube 33.

The base members 9 and 11 respectively carry control valves 43 and 44, which may, for example, take the form of four-way valves, and these valves control the flow of hydraulic fluid both in the advancing means and in the props themselves. The valve 43 controls the front prop means while the valve 44 controls the rear prop means. The valve 43 controls the advancing of the front prop means while the valve 44 controls the advancing of the rear prop means. For advancing the conveyer means an additional control element may be located at the front end of the tube 33, as pointed out below. The hydraulic interconnections between the props and the advancing means are located in the interior of the base members 9-14 and extend along the transverse beams 25 and 26. Unillustrated conduits extend from the transverse beams along the tube 31 to the rear end wall 45 of the tube 31 and along the tube 32 to the place where the latter is joined with the front end of the tube 31, as indicated diagrammatically in Fig. 2 by the place where the conduits 59 and 60 are connected with the tube 32.

Figure 2:
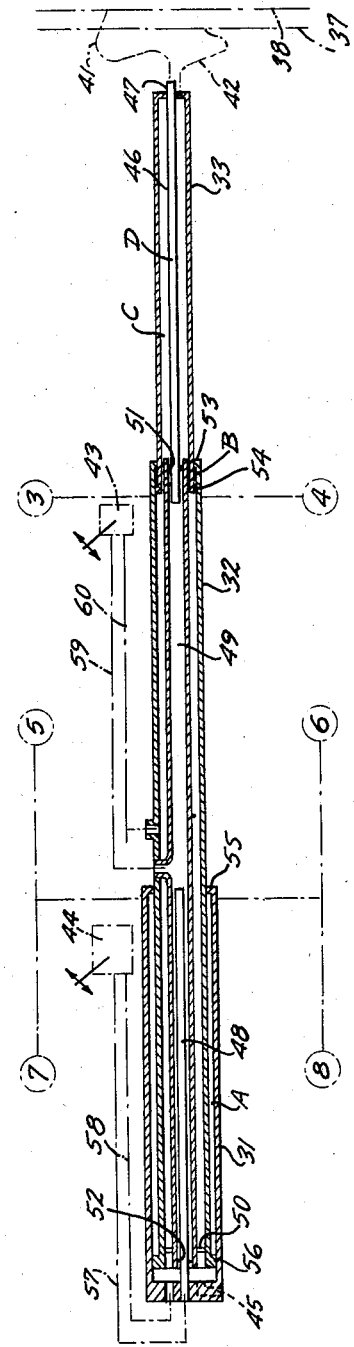
Fig. 2 is a schematic illustration of the structure of the invention in one position of the parts thereof.

Figs. 2-4 show schematically the advancing means of the present invention as well as the structure in the interior of the outer tubes 31 and 33 of the advancing means. It will be noted that the outer tube 33 of smallest diameter is the forwardmost tube and is connected with the conveyer means, while the outer tube 31 of largest diameter is connected with the rear prop means, the intermediate tube 32 being connected with the front prop means.

A plurality of inner telescoped tubes extend coaxially along the interior of the outer tubes 31 and 33, and the front inner tube 46 is carried by the front end wall 47 of the tube 33 as by being welded to the wall 47, and the rear inner tube 48 is fixedly carried by the rear wall 45 of the outer tube 31 as by being welded to this rear wall. The front and rear inner tubes 46 and 48 are of the same diameter and are respectively received in the interior of an intermediate tube 49 which is fixedly carried by a transverse member 50 which in turn is fixed in the interior of the intermediate tube 32. The transverse member 50 includes openings through which the hydraulic liquid can pass, and this transverse member 50 may be in the form of a ring surrounding and fixed to the tube 49 and having a plurality of spokes radiating therefrom and fixed at their outer ends to the inner surface of the tube 32 or to an outer ring which is in turn fixed to the inner surface of the tube 32. Sealing rings 51 and 52 are carried by the intermediate inner tube 49 at its opposite ends, respectively, and are in slidable, sealed engagement with the outer surfaces of the tubes 46 and 48, respectively, so that in this way the inner plurality of telescoped tubes are in fluidtight connection with each other. The outer front tube 33 has at its rear end an outwardly directed annular flange 54 which through a suitable sealing ring is in fluidtight sliding engagement with the inner surface of the tube 32, and the tube 32 has at its forward end an inwardly directed annular flange 53 located in front of the flange 54 and engaging through a suitable sealing ring the outer surface of the tube 33 so as to have a fluidtight sliding engagement with the latter. The tube 32 is provided at its rear end with an outwardly directed annular flange 56 which through a suitable sealing ring is in slidable, sealed engagement with the inner surface of the tube 31, and forwardly of the flange 56 the tube 31 is provided at its front end with an inwardly directed annular flange 55 which is in fluidtight slidable engagement with the outer surface of the tube 32. Thus, an elongated hollow cylindrical chamber A is formed between the flanges 55 and 56 in the interior of the tube 31 between the latter and the tube 32, while a cylindrical chamber B is formed in the interior of the tube 32 between the latter and the tube 33 and between the flanges 53 and 54, and also a third elongated hollow chamber C is provided in the interior of the outer tubes 31-33 between the latter and the inner telescoped tubes 46, 48 and 49. A fourth cylindrical chamber D is formed by the interior of the tube 46 between the ends thereof which are respectively at different pressures. The flow of hydraulic fluid to and from the control valve 44 takes place through the hose elements 41 and 42, through the telescopic tube portions of the advancing means, and through the fixedly mounted conduits 57 and 58, while the fixedly mounted conduits 59 and 60 serve to convey the hydraulic liquid to and from the control valve 43. The hydraulic liquid is supplied from the supply header 37 through the hose element 41 to the series of inner telescoped tubes 46, 48 and 49 and from the latter telescoped tubes the hydraulic fluid under pressure is supplied through the conduits 57 and 59 to the valves 44 and 43, respectively, while the return flow takes place from the control valves 44 and 43, respectively, through the conduits 58 and 60 to the chamber C which communicates through the hose element 42 with the return flow header 38. For a purpose which is described below, there is located at the front end wall 47 of the outer tube 33 a suitable control device 67 which may be manually actuated so as to reverse the connections of the hoses 41 and 42 with the end wall 47 so that when desired the hydraulic fluid under pressure will flow from the hose 41 into the chamber C, and the return flow will take place along the interior of the inner telescoped tubes and through the hose 42 back to the return flow conduit 38.

In the position of the advancing means illustrated diagrammatically in Fig. 2, the conveyer means is in its forwardmost position with respect to the front prop means. The forward movement of the conveyer means with respect to the front prop means can take place continually during the course of the cutting away of the coal or the advancing of the conveyer means can take place discontinuously in a single stroke or in a plurality of partial strokes. The continuous advancing of the conveyer means takes place as a result of the fluid under pressure which is continuously in the interior D of the tube 46 so as to urge the latter together with the tube 33 and the conveyer means forwardly with respect to the tube 32. Of course, at this time all of the props press their base members against the floor and their cap members against the roof of the gallery so that the tubes 31 and 32 are stationary and only the tube 33 can move forwardly with the tube 46 as a result of the fluid under pressure in the latter. The discontinuous advancing of the conveyer means is brought about by the above-mentioned control means 61 at the front end of the tube 33 which enables the hoses 41 and 42 to be reversed so that fluid under pressure introduced into the chamber C upon reversal of the hose connections will advance the tube 33 forwardly together with the conveyer means. With this control means the fluid under pressure is introduced into the chamber C in such a way as to move the tube 33 and the conveyer means forwardly in a single stroke or the reversal of the hose connections is made a plurality of times so as to provide a plurality of stroke portions which finally locate the conveyer means in the forwardmost position thereof indicated in Fig. 2.

The advancing of the conveyer means can also be carried out by an advancing means associated with a group of prop means different from the group illustrated in Fig. 1. For example, every fifth group of prop means may have an advancing means which advances the conveyer means while the remainder of the groups do not advance the conveyer means with their advancing means. Where the conveyer means is advanced by an advancing means from a different group of prop means, the tube 33 is pulled forwardly with the conveyer means without any particular expenditure of power. It is thus apparent that with the structure of the invention several different types of operations may be used, and the structure is highly flexible.

The end of the next stage in the advancing process is shown in Fig. 3. Thus, after the conveyer means has been advanced the front prop means is advanced. For this purpose the valve 43 is actuated so as to release the fluid under pressure from the props 3 and 4, and thus their cap members no longer press against the roof of the gallery, while the fluid under pressure is introduced into the chamber C. At this time the cap members 16 and 17 of the rear prop means are pressing against the roof so that the rear prop means and therefore the tube 31 cannot move, and also the conveyer means is already in its forwardmost position, so that the fluid under pressure acts on the flange 56 to move the intermediate tube 32 together with the front prop means forwardly from the position of Fig. 2 to that of Fig. 3. Thus, in this case, the front prop means is moved forwardly with respect to the rear prop means which resists movement of the front prop means in any other direction than forwardly. It is possible, however, to bring about the same result by introducing fluid under pressure into the chamber B. In this case, the conveyer means acts as the resisting element which remains stationary while the fluid under pressure acts on the flange 53 to shift the tube 32 together with the front prop means forwardly from the position of Fig. 2 to that of Fig. 3.

In this way, the conveyer means has been advanced first, and then the front prop means has been advanced, and the next stage in the process is to advance the rear prop means, the end of this latter stage being illustrated in Fig. 4. In order to advance the rear prop means, the fluid under pressure is released from the several props 5–8, while the props 3 and 4, which have in the meantime been set after having reached the position of Fig. 3, press their cap members against the roof and their base members press against the floor of the gallery, so that the front prop means remains stationary at this time and resists any forces which tend to move the front prop means. To advance the rear prop means forwardly fluid under pressure is introduced into the chamber A by suitable actuation of the valve 44, and thus the fluid pressure acts against the flange 55 to shift the tube 31 together with the rear prop means forwardly from the position of Fig. 3 to that of Fig. 4. The props 5–8 are then reset so as to press their cap members against the roof of the gallery and as the mining proceeds the above-described advancing process for the conveyer and prop arrangement is repeated.

The hydraulic circuit is schematically illustrated in Fig. 5. As described the control means 43 and 44 are in connection with the supply header 37 and the return flow header 38 of the hydraulic liquid. Conduits 57 and 58 serve to convey the hydraulic liquid to and from the control means 44. The flow of hydraulic fluid to and from the control means 43 takes place through conduits 59 and 60. The control device 61 located at the front end wall 47 of the tube 33 may be manually actuated so as to reverse the connections of the hoses 41 and 42 with the end wall 47.

The control means 43 is connected with the cylindrical chamber B by a conduit *a* and with the hydraulic props 3 and 4 by a conduit *b*. Through these conduits *a* and *b* the hydraulic liquid is supplied under pressure to the props 3 and 4 and the cylindrical chamber 3 or return flow of the hydraulic liquid takes place to one of the conduits 59 or 60 by a suitable actuation of the control means 43.

The control means 44 is connected with the cylindrical chamber A by a conduit *c* and with the props 5, 6, 7 and 8 by a conduit *d*, each of them adapted to convey hydraulic liquid to and from the chamber A or the props 5, 6, 7 and 8 by suitable actuation of the control means 44.

In the position of the advancing means shown in Fig. 5 the conveyer means is in its forwardmost position with respect to the props 3 and 4, similar to the stage illustrated in Fig. 2.

In order to move props 3 and 4 forwardly with respect to the props 5, 6, 7 and 8 from the position of Fig. 2 to that of Fig. 3 a relief valve located in the control means 43 is actuated to connect the conduit *b* with the conduit 60 for the return flow of the hydraulic fluid and to release the fluid under pressure from the props 3 and 4 so that their cap members no longer press against the roof of the gallery. The return flow of the hydraulic fluid to the return flow header 38 takes place through the conduits *b*, 60, the tubes 32 and 33 and the hose 42. Then the control means 43 is actuated so as to connect the conduits 59 and *a* and to supply the hydraulic liquid from the supply header 37 through the hose element 41, the inner telescoped tubes 46 and 49, the conduits 49 and *a* to the cylindrical chamber 3 to advance the tube 32 together with the props 3 and 4. It is possible, however, to bring about the same result by introducing fluid under pressure into chamber C. For this purpose the control means 61 is actuated so as to reverse the conneciotns of the hoses 41 and 42 with the end wall 47 of the tube 33 as described.

In order to set the props 3 and 4, which have reached the advanced position, the control means 43 is actuated to connect the conduits 59 and *b* for supplying hydraulic liquid under pressure to the props 3 and 4 so that the props 3 and 4 press their cap members against the roof and their base members against the floor of the gallery.

It will be understood that the advancing process of the props 5, 6, 7 and 8 takes place in a similar manner by suitable actuation of the control means 44 adapted to connect one of the conduits *c* and *d* with the conduit 57 or the conduit 58 in the desired sequence.

Instead of positioning the control valves 43 and 44 directly on bases members such as the members 9 and 11, respectively, it is possible to have a single central hydraulic control which in a known way is capable of controlling the structure from a central station. Also, it is possible to have a suitable control which can be shifted along the entire conveyer means.

The link 35 makes it possible for the front and rear prop means to move angularly with respect to each other or with respect to the conveyer means. In the latter case, the conveyer means may be progressively moved in a position which is other than perpendicular to the axis of the advancing means. The front end of the link 35 is provided with a pair of stop portions 35*a* which limit the extent to which pivotal turning can take place at the front pivot means 36 which interconnects the link 35 with the conveyer means 2. In this way, during the advancing of the conveyer the forces used for advancing the conveyer means cannot undesirably result in extensive turning of the link 35 rather than advancing of the conveyer means.

If for some reason the link 35 does not extend perpendicularly with respect to the conveyer means 2, the perpendicular relationship of these parts can be restored by releasing the fluid under pressure from the front props 3 and 4 while the rear props 5–8 remain set, and the front prop means is advanced while the tube 33 together with the conveyer means resists the fluid under pressure. This is done as described above by introducing fluid under pressure into the chamber B. As a result there is a tension on the tube 33 as well as the link 35 which returns the link 35 to its position extending perpendicularly from the conveyer means 2. As a result there is a lateral component of force on the transverse beam 25 which tends to move the front prop means laterally, and the result is that the rear prop means assumes an angular position with respect to the telescoped tubes of the advancing means. This takes place by resilient yielding of the cylinder 29. During the following advancing of the rear prop means the resilient force of the cylinder 29 returns the rear prop means to its original angular position with respect to the advancing means by the force which the cylinder 29 applies to the rear transverse beam 26. Thus, the stops at the front end of the link 35 guarantee that the perpendicular relationship between the conveyer means and the advancing means will always be restored.

A protective shield 15 is carried by tube 31 at the rear thereof on the back-fill side of the apparatus.

It will be understood that each of the elements described above, or two or more together, may also find a useful application in other types of mining apparatus differing from the types described above.

While the invention has been illustrated and described as embodied in a prop and conveyer arrangement for mines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a prop and conveyer arrangement for mines, in combination, elongated conveyer means adapted to extend along a mine face; front prop means located adjacent said conveyer means; rear prop means located adjacent said front prop means at the side thereof opposite from said conveyer means so that said front prop means is located between said conveyer means and said rear prop means; and a single hydraulic advancing means common to said conveyer means and said front and rear prop means and operatively connected to said conveyer means and said front and rear prop means for advancing said conveyer means, said front prop means, and said rear prop means toward the mine face, said hydraulic means including three elongated coaxial tubes cooperating telescopically with each other and respectively connected with said conveyer means, said front prop means, and said rear prop means so that when one of said tubes moves axially the means connected therewith will also move.

2. In a prop and conveyer arrangement for mines, in combination, elongated conveyer means adapted to extend along a mine face; front prop means located adjacent said conveyer means; rear prop means located adjacent said front prop means at the side thereof opposite from said conveyer means so that said front prop means is located between said conveyer means and said rear prop means; and a single hydraulic advancing means common to said conveyer means and said front and rear prop means and operatively connected to said conveyer means and said front and rear prop means for advancing said conveyer means, said front prop means, and said rear prop means toward the mine face, said hydraulic means including a plurality of outer telescopically connected tubes and a plurality of inner telescopically connected tubes extending coaxially along the interior of said outer tubes for leading hydraulic fluid through the interior of said outer tubes for telescopically shifting said outer tubes with respect to each other for advancing said conveyer means, front prop means, and rear prop means, said outer tubes being respectively connected with said conveyer means, said front prop means, and said rear prop means so that when one of said outer tubes moves axially the means connected thereto will also move.

3. In a prop and conveyer arrangement for mines, in combination, elongated conveyer means adapted to extend along a mine face; front prop means located adjacent said conveyer means; rear prop means located adjacent said front prop means at the side thereof opposite from said conveyer means so that said front prop means is located between said conveyer means and said rear prop means; and a single hydraulic advancing means common to said conveyer means and said front and rear prop means and operatively connected to said conveyer means and said front and rear prop means for advancing said conveyer means, said front prop means, and said rear prop means toward the mine face, said hydraulic means including a plurality of telescopically connected tubes which shift telescopically with respect to each other for advancing said conveyer means, said front prop means, and said rear prop means, said tubes being respectively connected with said conveyer means, said front prop means, and said rear prop means so that when one of said tubes moves axially the means connected thereto will move therewith, and the tube of smallest diameter being operatively connected with said conveyer means.

4. In a prop and conveyer arrangement for mines, in combination, elongated conveyer means adapted to extend along a mine face; front prop means located adjacent said conveyer means; rear prop means located adjacent said front prop means at the side thereof opposite from said conveyer means so that said front prop means is located between said conveyer means and said rear prop means; and a single hydraulic advancing means common to said conveyer means and said front and rear prop means and operatively connected to said conveyer means and said front and rear prop means for advancing said conveyer means, said front prop means, and said rear prop means toward the mine face, said hydraulic means including a plurality of telescopically connected tubes which shift telescopically with respect to each other for advancing said conveyer means, said front prop means, and said rear prop means, said tubes being respectively connected with said conveyer means, said front prop means, and said rear prop means so that when one of said tubes moves axially the means connected therewith will also move, said tubes extending substantially perpendicularly with respect to said conveyer means and said hydraulic means including a link pivotally connected adjacent one end to said conveyer means and adjacent an opposite end to the tube nearest said conveyer means so that said conveyer means and telescopically connected tubes may turn one with respect to the other.

5. In a prop and conveyer arrangement for mines, in combination, elongated conveyer means adapted to extend along a mine face; front prop means located adjacent said conveyer means; rear prop means located adjacent said front prop means at the side thereof opposite from said conveyer means so that said front prop means is located between said conveyer means and said rear prop means; and a single hydraulic advancing means common to said conveyer means and said front and rear prop means and operatively connected to said conveyer means and said front and rear prop means for advancing said conveyer means, said front prop means, and said rear prop means toward the mine face, said hydraulic means including a plurality of tubes telescopically connected and shifting with respect to each other for advancing said conveyer means, said front prop means, and said rear prop means, said tubes being respectively connected with said conveyer means, said front prop means, and said rear prop means so that when one of said tubes moves axially the means connected therewith will also move, said hydraulic means including a front elastic resilient means for transmitting the movement of the tube connected to said front prop means to the latter and a rear elastic resilient means for transmitting the movement of the tube connected to said rear prop means to the latter, said front and rear elastic means respectively returning said front and rear prop means to predetermined angular positions, respectively, with respect to said tubes after said front and rear prop means have respectively turned from said predetermined positions.

6. In a prop and conveyer arrangement for mines, in combination, elongated conveyer means adapted to extend along a mine face; front prop means located adjacent said conveyer means; rear prop means located adjacent said front prop means at the side thereof opposite from said conveyer means so that said front prop means is located between said conveyer means and said rear prop means; and a single hydraulic advancing means common to said conveyer means and said front and rear prop means and operatively connected to said conveyer means and said front and rear prop means for advancing said conveyer means, said front prop means, and said rear prop means toward the mine face, said hydraulic means including a plurality of tubes telescopically connected and shifting with respect to each other for advancing said conveyer means, said front prop means, and said rear prop means, said hydraulic means including a front elastic resilient means for transmitting the movement of said tubes to said front prop means and a rear elastic resilient means for transmitting the movement of said tubes to said rear prop means, said front and rear elastic means respectively returning said front and rear prop means to predetermined angular positions, respectively, with respect to said tubes after said front and rear prop means have respectively turned from said predetermined positions, said front and rear resilient elastic means respectively including a pair of elastic yieldable cylinders respectively surrounding a pair of said tubes and substantially rigid sleeves respectively surrounding said cylinders and respectively fixed to said front and rear prop means.

7. In a prop and conveyer arrangement for mines, in combination, a plurality of coaxial telescopically connected tubes including inner and outer end tubes and at least one intermediate tube; elongated conveyer means extending substantially perpendicularly with respect to the common axis of said tubes and operatively connected with one of said end tubes; front prop means operatively connected with said intermediate tube; rear prop means operatively connected with the other of said end tubes; and hydraulic conduit means extending at least in part along the interior of said tubes for introducing hydraulic liquid into or removing hydraulic liquid from the interior of said tubes; and valve means cooperating with said hydraulic conduit means for controlling the flow of hydraulic liquid to advance a preselected one of said tubes with respect to the other two tubes so that said conveyer means may be advanced with respect to said front and rear prop means when said one end tubes is advanced, so that said front prop means may be advanced with respect to said conveyer and rear prop means when said intermediate tube is advanced, and so that said rear prop means may be advanced with respect to said conveyer means and front prop means when said other end tube is advanced.

References Cited in the file of this patent

UNITED STATES PATENTS

| 2,675,134 | Becker | Apr. 13, 1954 |
| 2,714,505 | Joy | Aug. 2, 1955 |

FOREIGN PATENTS

| 139,054 | Australia | Oct. 16, 1950 |
| 919,343 | Germany | Oct. 21, 1954 |